Jan. 26, 1960  E. W. POTTMEYER  2,922,538
EMERGENCY BIN UNLOADING DEVICE
Filed Nov. 29, 1957  3 Sheets-Sheet 1
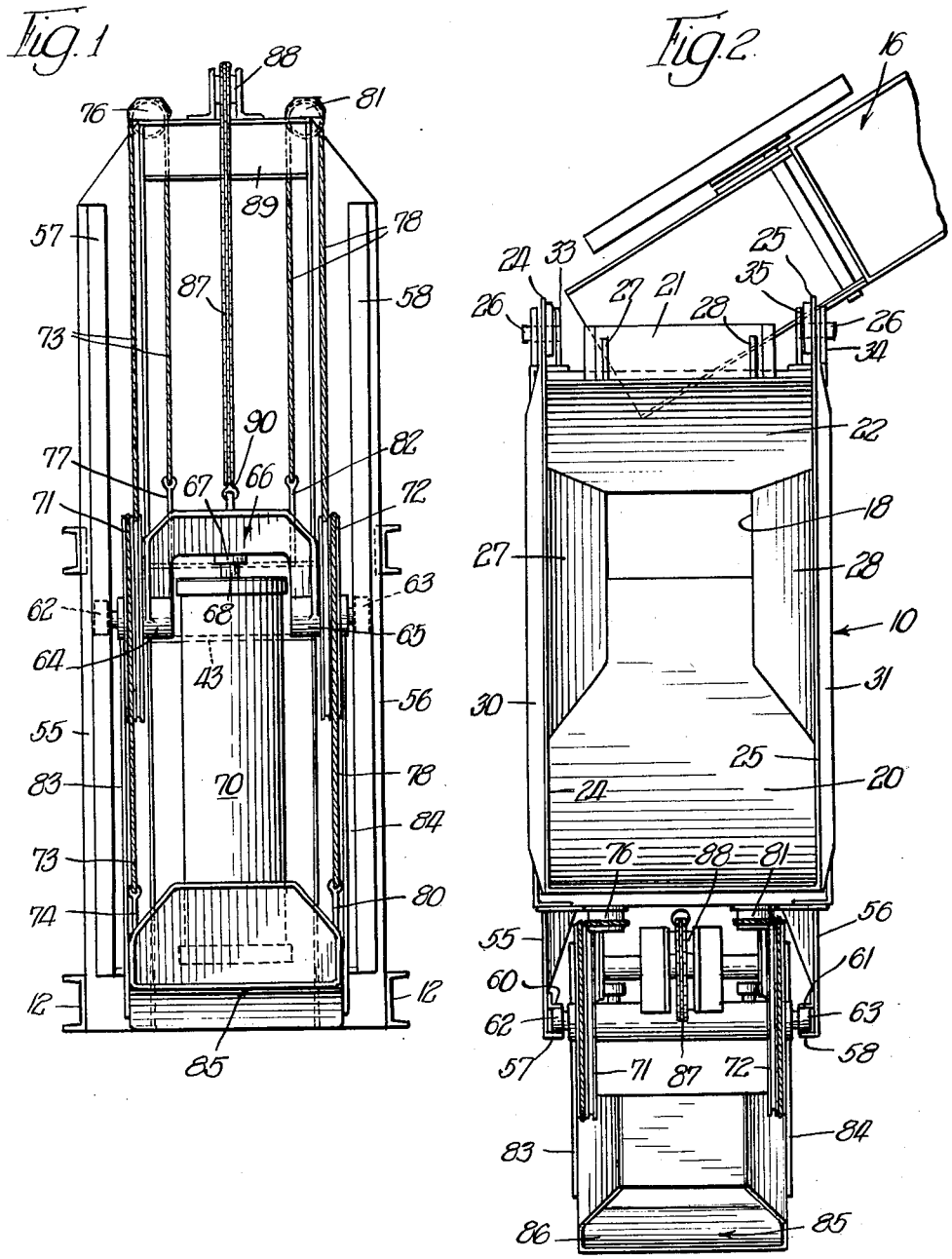
INVENTOR.
Edward W. Pottmeyer,
BY
Byron Hume Groen & Clement
attys.

Jan. 26, 1960 E. W. POTTMEYER 2,922,538
EMERGENCY BIN UNLOADING DEVICE
Filed Nov. 29, 1957 3 Sheets-Sheet 2
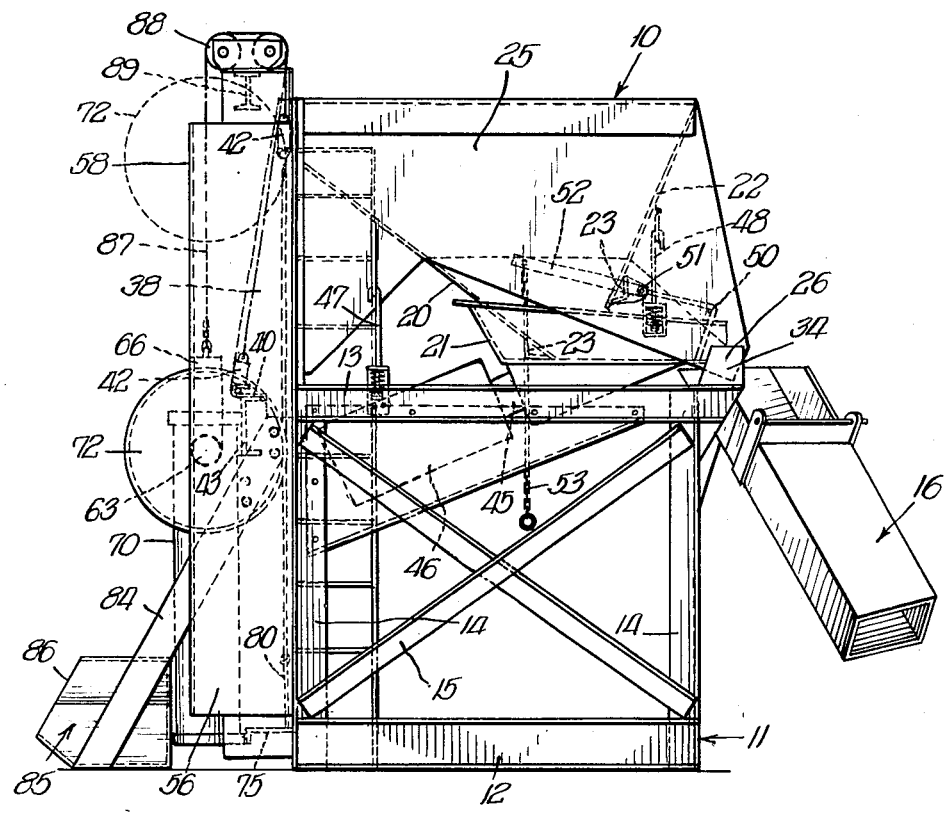
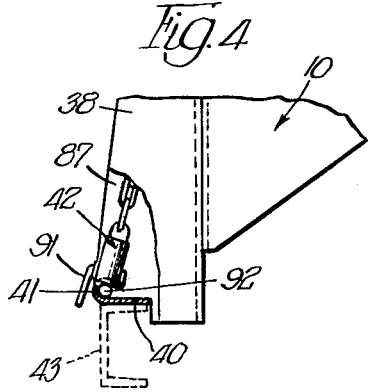
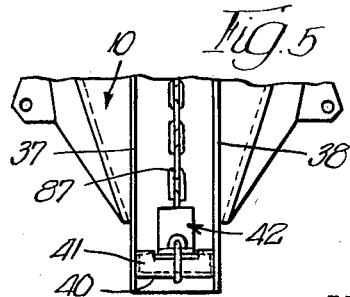
INVENTOR.
Edward W. Pottmeyer,
BY

United States Patent Office 2,922,538
Patented Jan. 26, 1960

2,922,538

EMERGENCY BIN UNLOADING DEVICE

Edward W. Pottmeyer, Fox Chapel, Pa., assignor to Blaw-Knox Company, Pittsburgh, Pa., a corporation of Delaware Application November 29, 1957, Serial No. 699,551

6 Claims. (Cl. 214—700)

This invention relates to a new and improved loading bucket hoist in combination with a hopper feeding assembly and has reference in particular to structure of this character wherein the pivoted hopper feeding assembly may be elevated by the bucket hoist for discharge purposes independently of the vibrating feeder thereof in the event of a breakdown of the latter or electrical power failure.

There are numerous types of material handling apparatus which include elevated hoppers from which material is delivered by gravity to feeding or distributing devices located under the hopper. It is necessary to elevate the material to store it in the hopper and for most devices it is desirable to have such elevating mechanism directly associated with the hopper and feeding assembly. In my copending application Serial No. 570,888, filed March 12, 1956, now Patent No. 2,823,819, and entitled Loading Bucket Hoist, there is disclosed improved bucket elevating apparatus for loading a hopper which in turn delivers the material by gravity to a vibrating feeder. Since the apparatus has its greatest utility in the steel making art for adding ladle additions, it is essential that the device should feed at all times even if the electrical power should fail or in the event of a breakdown of the vibrating feeder.

Accordingly, the present invention has for its primary object to provide a hopper assembly having a rear pivot connection with its supporting frame and which can be elevated by the power cylinder of the bucket hoist for locating the vibrating feeder in an elevated inclined position whereby the said feeder will discharge material therefrom as a gravity feed and independently of any vibrating action of the feeder.

A further and more particular object is to provide a combination bucket hoist and pivoted hopper assembly, wherein the bucket hoist is capable of lifting material from in front of the apparatus and delivering it behind the apparatus by a continuous lifting and swing movement and wherein the hopper assembly can be tilted by using the power cylinder of the bucket hoist to locate the vibrating feeder in an emergency feed position.

Another object is to provide a combination bucket hoist and pivoted hopper assembly which will include a releasable connection between the power cylinder of the hoist and the front end of the hopper assembly for tilting the hopper assembly for an emergency feeding thereby greatly extending the utility of the apparatus. Accordingly, the power cylinder of the bucket hoist has a dual function although with the connection released both devices will operate in their normal efficient manner to accomplish their intended purpose.

With these and other objects in view, the invention may consist of certain novel features of construction and operation as will be more fully described and particularly pointed out in the specification, drawings and claims appended thereto.

In the drawings, which illustrate an embodiment of the invention, and wherein like reference characters are used to designate like parts—

Figure 1 is a front elevation of apparatus embodying the improvements of the invention;

Figure 2 is a top plan view of the apparatus of Figure 1;

Figure 3 is a side elevational view of the apparatus with the hopper assembly and vibrating feeder thereof disposed in horizontal position for normal feeding operations.

Figure 4 is a fragmentary detail view in elevation showing the link for releasably connecting the power cylinder to the hopper assembly;

Figure 5 is a fragmentary front elevational view of the structure of Figure 4.

Figure 6:
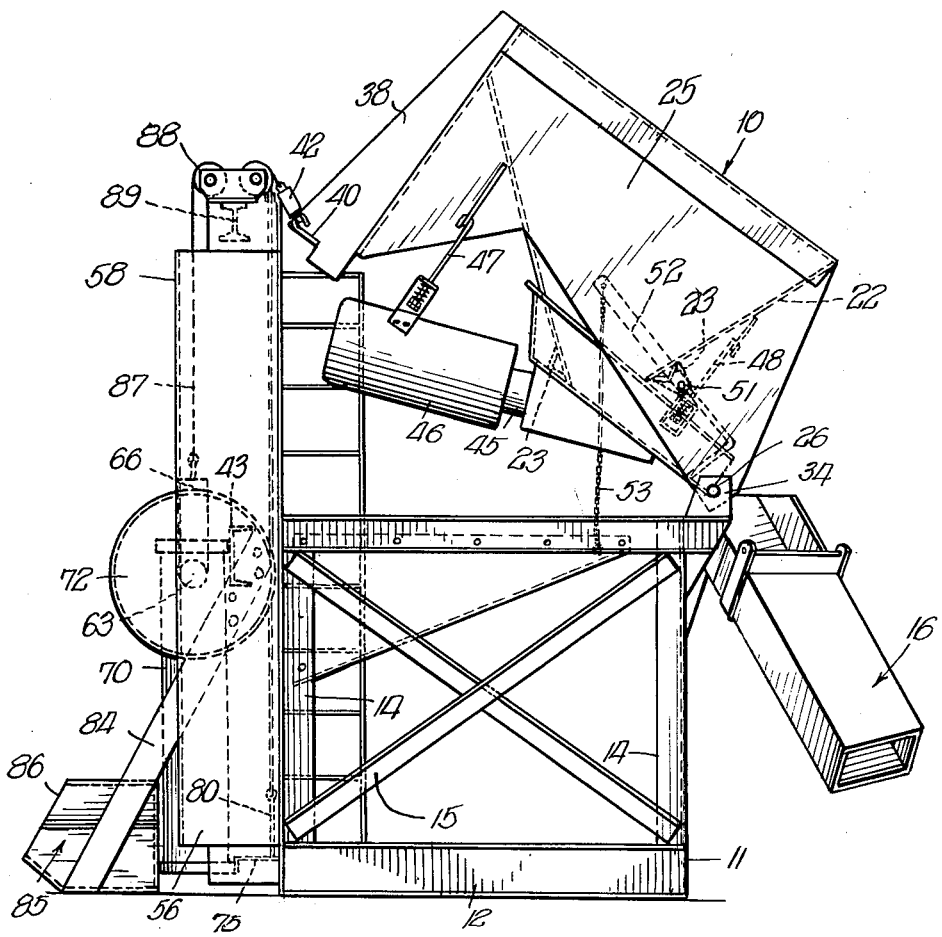
Figure 6 is a side elevational view of the apparatus showing the position which the hopper assumes when elevated to incline the vibrating feeder for emergency feeding operations.

In the construction shown in the drawings, the hopper generally indicated by numeral 10 is suitably supported from the framework 11, the said framework consisting of the bottom members 12, the top members 13, the uprights 14, and the cross pieces 15. A chute 16 is associated with the hopper and said chute may be supported in any convenient manner from the framework or from some other structure. The hopper 10 is also conventional in construction, the same including four specially shaped walls having sloping portions which at their lower terminal end define the hopper discharge opening 18, Figure 2. The sloping front wall 20 of the hopper is extended beyond the hopper opening as evident from an inspection of Figure 3, and thus this lower extending end of the front wall has location within the pan 21 of the vibrating feeder to be presently described in detail. However, the rear wall 22 terminates above the pan 21 and the terminating end of each wall is reinforced by angle pieces such as 23. The side walls 24 and 25, Figures 2 and 3, are disposed vertically, and it will be observed that the said side walls extend rearwardly beyond the rear wall 22 so as to have pivotal connection at 26 with the suporting framework. Side wall portions 27 and 28 slope inwardly and downwardly, and said portions also extend rearwardly beyond the wall 22 to complete the hopper structure.

However, the hopper 10 may be adequately reinforced around the top opening thereof by channel members identified by numerals 30 and 31 and for the pivotal connection it will be understood from Figures 2 and 3 that spaced brackets 32 and 33, suitably fixed to the framework 11, are provided on the left hand side of the hopper in connection with side wall 24, whereas, similar spaced brackets 34 and 35 are formed on the right hand side of the hopper in connection with the side wall 25. A pivot pin 26 is associated with each pair of spaced brackets and each pivot pin extends through openings formed in the brackets and in the rearwardly extending portion of its respective side wall, either 24 or 25. Thus, the rear end of the hopper is pivotally connected to framework 11 at a location relatively adjacent the chute 16 into which the hopper is adapted to discharge through the intermediate coaction of the vibrating feeder pan 21.

In accordance with the invention, the hopper 10 is additionally provided with forwardly extending spaced brackets 37 and 38 shown in detail in Figures 4 and 5, and which extend vertically for the full height of the hopper, as will be evident from Figure 3. The bottom ends of the spaced brackets 37 and 38 are formed to provide stepped portions, the outer of which includes the transverse wall 40. Formed integral with the wall are inwardly directed hook portions 41 which in effect provide spaced sockets for releasable connection with the locking pin generally indicated by numeral 42. With the locking pin thus connected the hopper can be elevated to tilt the hopper for emergency feeding, using the power cylinder of the bucket hoist for the purpose. However, when the hopper 10 is located in its normal horizontal position, the bottom wall 40 of the outer stepped portion of the spaced brackets 37 and 38 has contact with the channel beam 43 forming part of the structure of the bucket hoist and accordingly the channel beam 43 provides the horizontal support for thus supporting and positioning the hopper assembly.

The vibrating feeder pan 21 is suitably connected to the shaft 45 of a vibrating motor 46 by means of which the pan is vibrated, substantially horizontally, to effect a regulated discharge of the material received from the hopper into the chute 16. The vibrating motor and pan assembly are supported from the hopper by means of the spring cushioned hangers 47 and 48. Although pan 21 may be vibrated by operation of the motor 46, nevertheless discharge of the materials from the pan into the chute may be controlled by the gate 50 pivotally supported from the hopper as at 51 and having a rearwardly extending arm 52. The outer end of arm 52 has connection with the pull chain 53 and thus the operator by actuation of the chain can effect a raising or lowering of the gate 50 to control discharge of the material from the vibrating pan. The lower end of front wall 20 was described as having location within the pan 21. It will be understood also that the depending and extending ends of the side wall portions 27 and 28 are also located within vibrating pan 21 so that the material from the hopper is discharged onto the pan in a controlled manner and the same is properly directed toward the gate since spreading of the material laterally and forwardly is prevented by said depending ends of the hopper walls.

The frame for the bucket hoist includes frame members 55 and 56 which have in-turned vertical flanges 57 and 58, respectively. The angle irons 60 and 61 are secured in position, as best shown in Figure 2, to combine with flanges 57 and 58 to provide vertical tracks for receiving the rollers 62 and 63. These rollers are carried on the stub shafts 64 and 65 of the yoke 66, which is connected at 67 to the piston rod 68 of the power cylinder 70.

The sheaves 71 and 72 are mounted to rotate freely on the stub shafts 64 and 65. The cable 73 has its lower end connected to eye 74 and which is fixedly secured to the lower frame member 75, Figure 3, of the bucket hoist assembly. Said cable 73 passes upwardly and over the sheave 71 from behind and then downwardly in front of and around the sheave. At a point adjacent the underside of the sheave the cable 73 is suitably secured or clamped thereto and beyond this fastening point the cable then passes upwardly behind sheave 71 to a fixed supporting member 76. The cable passes around the member 76 and then downwardly to the eye 77 which is permanently secured to the channel beam 43. The cable 78 is fastened at its lower end to the eye bolt 80 and the same passes upwardly and then around the sheave 72 from behind, being secured thereto as described in connection with cable 73. The cable continues from behind sheave 73 and passes upwardly and over the fixed support member 81 and then downwardly to eye bolt 82, which is similarly anchored in channel beam 43.

The sheave 71 has the arm 83 fixedly secured thereto and in a similar manner arm 84 is secured to sheave 72, all in a manner as shown in Figure 3. These arms are permanently secured to bucket 85, which is shown as having an open face 86 for receiving and discharging the material to be elevated. The normal or loading position of the bucket hoist is shown in Figure 3. After the material to be elevated has been located in bucket 85 pneumatic or hydraulic pressure is applied to cylinder 70 below the piston therein so as to move the piston rod 68 and with it the yoke 66 in an upward direction. The yoke carries with it the sheaves 71 and 72 and which are guided in their movement by the rollers 62 and 63 which have movement in their track-way, the said rollers having connected relation through the stub shafts with the yoke 66. The cables 73 and 78 cause the sheaves 71 and 72 to rotate in a clockwise direction, Figure 3, as they are moved upwardly and thus the sheaves effect a lifting and a swinging of the arms 83 and 84 and accordingly similar lifting and swinging movement of bucket 85. At its upper limit of movement the bucket 85 reaches a dump position over hopper 10 and the material contained within the bucket is discharged into the hopper. By reversing the pressure within cylinder 70 the parts will return to the loading position of Figures 1 and 3.

The locking pin 42 is suitably connected by a chain 87 or other flexible means with the yoke 66, it being observed that the said chain passes over rollers 88 supported by the frame of the bucket hoist and located on the top beam 89 of said frame. From the rollers 88 the chain passes downwardly for securement at 90 to the yoke 66. Accordingly as the yoke 66 moves up and down in the operation of loading the hopper, it will be understood that the locking pin 42 will travel idly in an up and down direction adjacent the forward structure of the hopper and frame assembly. Thus during normal operation of the apparatus no use is made of the connecting link 42, the same merely moving up and down with movements of the yoke and its weight functioning to maintain adequate tension in the flexible connecting chain 87. However, in the event the electrical power for the vibrating motor 46 should fail, or should the motor or vibrating mechanism cease to function properly, a continuous feed to chute 16 can be maintained by elevating the hopper 10 so as to locate the pan 21 in an emergency feeding position, all as shown in Figure 6. To effect this emergency feeding position of the hopper 10 it is only necessary to connect the locking pin 42 to the socket provided by the portions 41. By turning the lever handle 91 of the locking pin in a downward direction the horizontally disposed pin 92 thereof is retained within the socket and prevented from accidental disconnection. With the locking pin 42 connected to the forward end of the hopper, the power cylinder 70 is energized to cause travel of its piston in a downward direction, with the result that this forward end of the hopper is elevated into a tilting inclined position to similarly position the pan 21. In this elevated tilted position of the hopper the same will continue to discharge material into the pan 21 and the pan is so inclined that it will in turn discharge the material by gravity into the chute 16. The provision of a hopper pivotally supported at its lower rear end and normally resting on a beam of the supporting framework at its lower front end, in combination with a releasable connection to a chain hoist powered by the loading bucket, although an emergency feature, greatly extends the utility of the ladle addition feeder such as disclosed.

The emergency feature of the present apparatus does not in any manner interfere with the normal operation of the parts thereof, although the emergency feature is available at all times to continue the feeding should a crisis exist wherein the vibrating feeder is incapable of functioning such as by reason of a physical breakdown or a failure of the electrical power.

What is claimed is:

1. In apparatus of the character described, in combination, a bucket hoist for loading a hopper, said hoist including a bucket and mechanism constructed and arranged for moving the bucket in a substantially vertical path to and from loading and dump positions, a hopper for receiving material from the bucket when in dump position, a vibrating feeder providing a pan located below the discharge opening of the hopper and said feeder and pan being suspended from the hopper, said hopper and pan being horizontally disposed for normal operation of the vibrating feeder whereby the pan is caused to vibrate in a horizontal plane for feeding the material discharged from the hopper, means pivotally supporting the hopper at its base below and adjacent the feeding end of the pan, and other means for releasable attachment to the end of the pivoted hopper opposite its pivot to provide an operative connection between the bucket hoist and the hopper for tilting the same to incline the pan whereby it will discharge its contents by gravity.

2. In apparatus of the character described, in combination, a bucket hoist for loading a hopper, said hoist including a bucket and mechanism constructed and arranged for moving the bucket in a substantially vertical path to and from loading and dump positions, a hopper in associated relation with the bucket hoist and adapted to receive the material from the bucket when in a dump position, means pivotally supporting the hopper at its lower end remote from the bucket hoist, a vibrating feeder providing a pan located below the discharge opening of the hopper and adapted to vibrate in a horizontal plane for feeding the material discharged from the hopper, means suspending the feeder and pan from the hopper, and means providing an operative connection between the bucket hoist and that end of the hopper adjacent the hoist for elevating said end to tilt the hopper whereby to locate the pan in an inclined position for discharging its contents by gravity, said means being releasable whereby when released the hopper can be disposed horizontally to permit normal operation of the bucket hoist and vibrating feeder.

3. In apparatus of the character described, the combination with a frame providing vertical guideways, a bucket hoist associated with said frame and including mechanism constrained to move in a path as defined by said guideways for moving a bucket to and from a loading position and an elevated dump position, a hopper also supported by the frame and positioned to receive the material from the bucket when in a dump position, a vibrating feeder providing a pan located below the discharge opening of the hopper and said feeder and pan being suspended from the hopper, said hopper and pan being horizontally disposed for normal operation of the vibrating feeder whereby the pan is caused to vibrate in a horizontal plane for feeding the material discharged from the hopper, means pivotally securing the hopper to the frame at the end thereof from which the material is delivered by the feeding action of the pan, and flexible means for releasable attachment to the end of the hopper opposite its pivot to provide an operative connection between said mechanism and the hopper, whereby the said end of the hopper can be lifted to locate the pan in an inclined position for discharging its contents by gravity.

4. In a combination loading bucket hoist and hopper assembly, a frame providing spaced vertical guideways, a yoke having axles extending therefrom and being guided by the guideways for vertical movement therein, sheaves on the axles, a bucket having a secured relation with said sheaves, cables having their ends fixed to the frame and extending around the sheaves and parallel to the guideways, power means for the yoke for effecting vertical movements thereof as permitted by the guideways whereby the sheaves are caused to rotate to produce vertical travel of the bucket and swinging movements thereof across the vertical path defined by the guideways, said hopper assembly including a hopper pivoted to the frame at its lower end remote from the bucket hoist, a vibrating feeder providing a pan located below the hopper and adapted to vibrate in a horizontal plane for feeding the material discharged from the hopper, means suspending the feeder and pan from the hopper, and means providing a releasable connection between the yoke and the hopper for elevating the end of the pivoted hopper adjacent the bucket hoist whereby to tilt the hopper and locate the pan in an inclined position for discharging its contents by gravity.

5. A combination loading bucket hoist and hopper assembly as defined by claim 4, wherein the said means providing a releasable connection between the yoke and the hopper includes a locking pin adapted to be releasably secured to the hopper by means of a socket member provided by the hopper.

6. In a combination loading bucket hoist and hopper assembly, a frame providing spaced vertical guideways, a yoke having axles extending therefrom and being guided by the guideways for vertical movement therein, sheaves on the axles for free rotation, a bucket secured by means of arms to the sheaves, cables having their ends fixed to the frame and extending around the sheaves and parallel to the guideways, power means for the yoke for effecting vertical movements thereof as permitted by the guideways whereby the sheaves are caused to rotate to produce vertical travel of the bucket and swinging movements thereof to and from a loading position and an elevated dumping position, said hopper assembly including a hopper located for receiving the material from the bucket when in a dump position, a vibrating feeder providing a pan suspended from the hopper and located below the discharge opening of the hopper, said hopper and pan being horizontally positioned for normal operation of the vibrating feeder whereby the pan is vibrated for feeding the material discharged from the hopper, means pivotally securing the hopper to the frame at that end of the hopper from which the materials are delivered by the feeding action of the pan, and flexible means fixed to the yoke at one end and adapted to have releasable connection at its other end to the hopper for elevating the end of the hopper opposite its pivot by movement of the yoke to thereby locate the pan in an inclined emergency feeding position whereby its contents are discharged by gravity.

References Cited in the file of this patent

UNITED STATES PATENTS

| | | |
|---|---|---|
| 2,712,892 | Warren | July 12, 1955 |
| 2,744,670 | Bendot | May 8, 1956 |
| 2,823,819 | Pottmeyer | Feb. 18, 1958 |